(12) United States Patent
Jones et al.

(10) Patent No.: US 10,107,108 B2
(45) Date of Patent: Oct. 23, 2018

(54) ROTOR BLADE HAVING A FLARED TIP

(71) Applicant: General Electric Company, Schenectady, NY (US)

(72) Inventors: Jeffrey Clarence Jones, Simpsonville, SC (US); Xiuzhang James Zhang, Simpsonville, SC (US); Mitchell Allan Merrill, Taylors, SC (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 14/699,321

(22) Filed: Apr. 29, 2015

(65) Prior Publication Data

US 2016/0319673 A1 Nov. 3, 2016

(51) Int. Cl.
*F01D 5/18* (2006.01)
*F01D 5/20* (2006.01)
(Continued)

(52) U.S. Cl.
CPC ............... *F01D 5/187* (2013.01); *F01D 5/20* (2013.01); *F02C 3/04* (2013.01); *F02C 7/18* (2013.01); *F05D 2220/32* (2013.01); *F05D 2240/304* (2013.01); *F05D 2240/307* (2013.01); *F05D 2240/35* (2013.01); *F05D 2250/294* (2013.01);
(Continued)

(58) Field of Classification Search
CPC .......... F02C 7/18; F02C 3/04; F05D 2220/32; F05D 2240/304; F05D 2240/307; F05D 2240/35; F05D 2250/294; F05D 2250/324; F05D 2260/202; F01D 5/20; F01D 5/187
See application file for complete search history.

(56) References Cited

U.S. PATENT DOCUMENTS

| 1,828,409 A | 10/1931 | Densmore |
| 1,955,929 A | 4/1934 | Mueller |

(Continued)

FOREIGN PATENT DOCUMENTS

| CN | 1126796 A | 7/1996 |
| CN | 1461872 A | 12/2003 |

(Continued)

OTHER PUBLICATIONS

Extended European Search Report and Opinion issued in connection with related EP Application No. 16166812.4 dated Aug. 8, 2016.

(Continued)

*Primary Examiner* — Logan Kraft
*Assistant Examiner* — Justin A Pruitt
(74) *Attorney, Agent, or Firm* — Dorrity & Manning, P.A.

(57) ABSTRACT

A rotor blade includes an airfoil having a blade tip and a tip cavity formed at the blade tip. The tip cavity includes a tip cap that is recessed radially inwardly from the tip and surrounded continuously by pressure and suction side walls of the airfoil. The tip cap further includes an aperture that extends through the tip cap and provides for fluid communication between an internal cavity defined within the airfoil and the tip cavity. An exhaust port provides for fluid communication out the tip cavity through one of the pressure side wall, the suction side wall or the trailing edge. A portion of at least one of the suction side wall and the pressure side wall that defines the tip cavity extends obliquely outwardly from the tip cavity with respect to a radial direction.

9 Claims, 5 Drawing Sheets

(51) Int. Cl.
*F02C 3/04* (2006.01)
*F02C 7/18* (2006.01)

(52) U.S. Cl.
CPC .. *F05D 2250/324* (2013.01); *F05D 2260/202* (2013.01)

(56) References Cited

U.S. PATENT DOCUMENTS

| | | |
|---|---|---|
| 2,714,499 A | 8/1955 | Warner |
| 3,012,709 A | 12/1961 | Schnell |
| 3,635,585 A | 1/1972 | Charles |
| 3,781,129 A | 12/1973 | Aspinwall |
| 3,844,679 A | 10/1974 | Grondahl et al. |
| 3,854,842 A | 12/1974 | Caudill |
| 3,973,874 A | 8/1976 | Corsmeier et al. |
| 4,010,531 A | 3/1977 | Andersen et al. |
| 4,142,824 A | 3/1979 | Andersen |
| 4,208,167 A | 6/1980 | Sato et al. |
| 4,390,320 A | 6/1983 | Eiswerth |
| 4,424,001 A | 1/1984 | North et al. |
| 4,497,613 A | 2/1985 | Carreno |
| 4,589,823 A | 5/1986 | Koffel |
| 4,604,031 A | 8/1986 | Moss et al. |
| 4,606,701 A | 8/1986 | McClay et al. |
| 4,627,480 A | 12/1986 | Lee |
| 4,682,933 A | 7/1987 | Wagner |
| 4,682,935 A | 7/1987 | Martin |
| 4,724,104 A | 2/1988 | Kim |
| 4,761,116 A | 8/1988 | Braddy et al. |
| 4,893,987 A | 1/1990 | Lee et al. |
| 4,940,388 A | 7/1990 | Lilleker et al. |
| 4,992,025 A | 2/1991 | Stroud et al. |
| 5,073,086 A | 12/1991 | Cooper |
| 5,088,892 A | 2/1992 | Weingold et al. |
| 5,125,798 A | 6/1992 | Muth et al. |
| 5,183,385 A | 2/1993 | Lee et al. |
| 5,192,192 A | 3/1993 | Ourhaan |
| 5,261,789 A | 11/1993 | Lee |
| 5,282,721 A | 2/1994 | Kildea |
| 5,286,168 A | 2/1994 | Smith |
| 5,361,828 A | 11/1994 | Lee et al. |
| 5,397,217 A | 3/1995 | Demarche et al. |
| 5,403,158 A | 4/1995 | Auxier |
| 5,476,364 A | 12/1995 | Kildea |
| 5,480,285 A | 1/1996 | Patel et al. |
| 5,503,527 A | 4/1996 | Lee et al. |
| 5,511,946 A | 4/1996 | Lee et al. |
| 5,525,038 A | 6/1996 | Sharma et al. |
| 5,536,143 A | 7/1996 | Jacala et al. |
| 5,564,902 A | 10/1996 | Tomita |
| 5,660,523 A | 8/1997 | Lee |
| 5,720,431 A | 2/1998 | Sellers et al. |
| 5,733,102 A | 3/1998 | Lee et al. |
| 5,738,489 A | 4/1998 | Lee |
| 5,738,491 A | 4/1998 | Lee et al. |
| 5,848,876 A | 12/1998 | Tomita |
| 5,873,695 A | 2/1999 | Takeishi et al. |
| 5,924,843 A | 7/1999 | Staub et al. |
| 5,927,946 A * | 7/1999 | Lee ................ F01D 5/20 415/115 |
| 5,927,964 A | 7/1999 | Fawcett |
| 5,980,209 A | 11/1999 | Barry et al. |
| 5,997,251 A | 12/1999 | Lee |
| 6,017,189 A | 1/2000 | Judet et al. |
| 6,019,579 A | 2/2000 | Fukuno et al. |
| 6,027,306 A | 2/2000 | Bunker |
| 6,039,531 A | 3/2000 | Suenaga et al. |
| 6,059,530 A | 5/2000 | Lee |
| 6,077,034 A | 6/2000 | Tomita et al. |
| 6,079,948 A | 6/2000 | Sasaki et al. |
| 6,086,328 A | 7/2000 | Lee |
| 6,142,739 A * | 11/2000 | Harvey ............ F01D 5/20 415/173.1 |
| 6,164,914 A | 12/2000 | Correia et al. |
| 6,179,556 B1 | 1/2001 | Bunker |
| 6,183,194 B1 | 2/2001 | Cunha et al. |
| 6,190,129 B1 | 2/2001 | Mayer et al. |
| 6,190,130 B1 | 2/2001 | Fukue et al. |
| 6,224,336 B1 | 5/2001 | Kercher |
| 6,241,467 B1 | 6/2001 | Zelesky et al. |
| 6,257,830 B1 | 7/2001 | Matsuura et al. |
| 6,419,446 B1 | 7/2002 | Kvasnak et al. |
| 6,422,817 B1 | 7/2002 | Jacala et al. |
| 6,464,462 B2 | 10/2002 | Stathopoulos et al. |
| 6,474,947 B1 | 11/2002 | Yuri |
| 6,491,493 B1 | 12/2002 | Watanabe et al. |
| 6,491,496 B2 | 12/2002 | Starkweather |
| 6,499,949 B2 | 12/2002 | Schafrik et al. |
| 6,502,303 B2 | 1/2003 | Updegrove et al. |
| 6,527,514 B2 | 3/2003 | Roeloffs |
| 6,554,564 B1 | 4/2003 | Lord |
| 6,554,575 B2 | 4/2003 | Leeke et al. |
| 6,579,066 B1 | 6/2003 | Saito et al. |
| 6,595,749 B2 | 7/2003 | Lee et al. |
| 6,595,750 B2 | 7/2003 | Parneix et al. |
| 6,652,235 B1 | 11/2003 | Keith et al. |
| 6,672,829 B1 | 1/2004 | Cherry et al. |
| 6,722,851 B1 | 4/2004 | Brittingham et al. |
| 6,761,535 B1 | 7/2004 | McGrath et al. |
| 6,790,005 B2 | 9/2004 | Lee et al. |
| 6,799,948 B2 | 10/2004 | Ito et al. |
| 6,837,687 B2 | 1/2005 | Lee et al. |
| 6,887,042 B2 | 5/2005 | Ito et al. |
| 6,921,246 B2 | 7/2005 | Brainch et al. |
| 6,957,949 B2 | 10/2005 | Hyde et al. |
| 6,966,756 B2 | 11/2005 | McGrath et al. |
| 6,969,232 B2 | 11/2005 | Zess et al. |
| 7,029,235 B2 | 4/2006 | Liang |
| 7,048,509 B2 | 5/2006 | Tominaga et al. |
| 7,059,834 B2 | 6/2006 | Chlus et al. |
| 7,118,329 B2 | 10/2006 | Goodman |
| 7,134,842 B2 | 11/2006 | Tam et al. |
| 7,217,101 B2 | 5/2007 | Harvey |
| 7,220,100 B2 | 5/2007 | Lee et al. |
| 7,255,536 B2 | 8/2007 | Cunha et al. |
| 7,278,826 B2 | 10/2007 | Blaskovich et al. |
| 7,281,894 B2 | 10/2007 | Lee et al. |
| 7,287,959 B2 | 10/2007 | Lee et al. |
| 7,290,986 B2 | 11/2007 | Stegemiller et al. |
| 7,300,250 B2 | 11/2007 | Papple |
| 7,309,212 B2 | 12/2007 | Itzel et al. |
| 7,351,035 B2 | 4/2008 | Deschamps et al. |
| 7,367,123 B2 | 5/2008 | Itzel et al. |
| 7,377,746 B2 | 5/2008 | Brassfield et al. |
| 7,416,391 B2 | 8/2008 | Veltre et al. |
| 7,476,086 B2 | 1/2009 | Wadia et al. |
| 7,530,788 B2 | 5/2009 | Boury et al. |
| 7,544,043 B2 | 6/2009 | Eastman et al. |
| 7,597,539 B1 | 10/2009 | Liang |
| 7,628,588 B2 | 12/2009 | Itzel et al. |
| 7,632,062 B2 | 12/2009 | Harvey et al. |
| 7,641,444 B1 | 1/2010 | Liang |
| 7,641,446 B2 | 1/2010 | Harvey |
| 7,674,093 B2 | 3/2010 | Lee et al. |
| 7,731,483 B2 | 6/2010 | Delong et al. |
| 7,766,606 B2 | 8/2010 | Liang |
| 7,811,054 B2 | 10/2010 | Eastman et al. |
| 7,837,440 B2 | 11/2010 | Bunker et al. |
| 7,922,451 B1 | 4/2011 | Liang |
| 7,922,455 B2 | 4/2011 | Itzel et al. |
| 7,931,444 B2 | 4/2011 | Godsk et al. |
| 7,985,053 B2 | 7/2011 | Schott et al. |
| 7,997,865 B1 | 8/2011 | Liang |
| 7,997,875 B2 | 8/2011 | Nanukuttan et al. |
| 8,052,395 B2 | 11/2011 | Tragesser et al. |
| 8,061,987 B1 | 11/2011 | Liang |
| 8,092,178 B2 * | 1/2012 | Marini ............ F01D 5/20 416/96 R |
| 8,096,768 B1 * | 1/2012 | Liang ............ F01D 5/187 415/116 |
| 8,105,031 B2 | 1/2012 | Trindade et al. |
| 8,105,037 B2 | 1/2012 | Grover et al. |
| 8,133,030 B2 | 3/2012 | Grafitti et al. |
| 8,133,032 B2 | 3/2012 | Tibbott et al. |

(56) References Cited

U.S. PATENT DOCUMENTS

| | | | |
|---|---|---|---|
| 8,147,188 B2 | 4/2012 | Reeves et al. | |
| 8,157,504 B2 | 4/2012 | Amaral et al. | |
| 8,172,533 B2 | 5/2012 | Pinero et al. | |
| 8,246,307 B2 | 8/2012 | Cheong et al. | |
| 8,347,947 B2 | 1/2013 | Dube et al. | |
| 8,371,815 B2 | 2/2013 | Farrell | |
| 8,449,249 B2 | 5/2013 | Suchezky | |
| 8,512,003 B2 | 8/2013 | Klasing et al. | |
| 8,568,097 B1 | 10/2013 | Liang | |
| 8,591,189 B2 | 11/2013 | Correia et al. | |
| 8,602,740 B2 | 12/2013 | O'Hearn et al. | |
| 8,632,311 B2 | 1/2014 | Klasing et al. | |
| 8,647,066 B2 | 2/2014 | Guimbard et al. | |
| 8,647,067 B2 | 2/2014 | Pandey et al. | |
| 8,662,825 B2 | 3/2014 | Ireland et al. | |
| 8,684,684 B2 | 4/2014 | Clements et al. | |
| 8,720,207 B2 | 5/2014 | Gersbach et al. | |
| 8,721,291 B2 | 5/2014 | Lee et al. | |
| 8,801,377 B1* | 8/2014 | Liang | F01D 5/186 416/97 R |
| 8,821,111 B2 | 9/2014 | Gear et al. | |
| 8,870,524 B1 | 10/2014 | Liang | |
| 8,870,585 B2 | 10/2014 | Lee et al. | |
| 8,967,959 B2 | 3/2015 | Stein et al. | |
| 9,096,768 B2 | 8/2015 | Chopra et al. | |
| 9,103,213 B2 | 8/2015 | Barr et al. | |
| 9,188,017 B2 | 11/2015 | Xu | |
| 9,593,584 B2 | 3/2017 | Lehmann et al. | |
| 2002/0141863 A1 | 10/2002 | Liu et al. | |
| 2002/0182074 A1 | 12/2002 | Bunker | |
| 2002/0197160 A1 | 12/2002 | Liang | |
| 2003/0021684 A1 | 1/2003 | Downs et al. | |
| 2003/0059304 A1 | 3/2003 | Leeke et al. | |
| 2003/0108425 A1 | 6/2003 | Bariaud et al. | |
| 2003/0118445 A1 | 6/2003 | Lee et al. | |
| 2003/0170120 A1 | 9/2003 | Grunke et al. | |
| 2004/0062636 A1 | 4/2004 | Mazzola | |
| 2004/0135315 A1 | 7/2004 | Chabot et al. | |
| 2004/0179940 A1 | 9/2004 | Liang | |
| 2005/0232768 A1* | 10/2005 | Heeg | F01D 5/186 416/97 R |
| 2005/0232772 A1 | 10/2005 | Race et al. | |
| 2005/0244270 A1 | 11/2005 | Liang | |
| 2006/0088420 A1 | 4/2006 | Lee | |
| 2006/0171809 A1 | 8/2006 | Albrecht et al. | |
| 2007/0059182 A1 | 3/2007 | Stegemiller et al. | |
| 2007/0128033 A1 | 6/2007 | Lee et al. | |
| 2007/0258810 A1 | 11/2007 | Aotsuka et al. | |
| 2007/0258819 A1 | 11/2007 | Allen-Bradley et al. | |
| 2008/0118367 A1 | 5/2008 | Liang et al. | |
| 2008/0232968 A1 | 9/2008 | Nguyen | |
| 2009/0003987 A1 | 1/2009 | Zausner et al. | |
| 2010/0054955 A1 | 3/2010 | Helvaci et al. | |
| 2010/0111704 A1 | 5/2010 | Hada | |
| 2010/0158696 A1 | 6/2010 | Pandey et al. | |
| 2010/0189023 A1 | 7/2010 | Lindgren et al. | |
| 2010/0196154 A1 | 8/2010 | Sakamoto et al. | |
| 2011/0044818 A1 | 2/2011 | Kuhne et al. | |
| 2011/0176929 A1 | 7/2011 | Ammann et al. | |
| 2011/0255985 A1* | 10/2011 | Diamond | F01D 5/20 416/223 R |
| 2011/0255986 A1 | 10/2011 | Diamond et al. | |
| 2011/0255990 A1 | 10/2011 | Diamond et al. | |
| 2012/0163993 A1 | 6/2012 | Levine et al. | |
| 2012/0189458 A1 | 7/2012 | Cheong et al. | |
| 2012/0201688 A1 | 8/2012 | Mahle et al. | |
| 2012/0328451 A1 | 12/2012 | Lomas et al. | |
| 2013/0108424 A1 | 5/2013 | Stein et al. | |
| 2013/0108444 A1 | 5/2013 | Stein et al. | |
| 2013/0236319 A1 | 9/2013 | Rockarts et al. | |
| 2014/0047842 A1 | 2/2014 | Chlus et al. | |
| 2014/0271225 A1 | 9/2014 | Herzlinger et al. | |
| 2015/0110639 A1 | 4/2015 | Herzlinger et al. | |
| 2015/0110640 A1 | 4/2015 | Herzlinger et al. | |
| 2015/0110641 A1 | 4/2015 | Herzlinger et al. | |

FOREIGN PATENT DOCUMENTS

| | | |
|---|---|---|
| CN | 1512038 A | 7/2004 |
| DE | 1428165 A1 | 2/1969 |
| DE | 19944923 | 3/2001 |
| DE | 19963375 A1 | 7/2001 |
| EP | 1059419 A1 | 12/2000 |
| EP | 1085171 A2 | 3/2001 |
| EP | 1221537 A | 7/2002 |
| EP | 1298285 A2 | 4/2003 |
| EP | 1367222 A | 12/2003 |
| EP | 1591624 A1 | 11/2005 |
| EP | 1650404 A2 | 4/2006 |
| EP | 1748153 A1 | 1/2007 |
| EP | 2479381 A1 | 7/2012 |
| EP | 2 586 984 A2 | 5/2013 |
| EP | 2746536 A1 | 6/2014 |
| FR | 2227427 A1 | 11/1974 |
| FR | 2891003 A | 3/2007 |
| GB | 946794 A | 1/1964 |
| GB | 2105415 A | 3/1983 |
| GB | 2155558 A | 9/1985 |
| JP | S4998602 U | 12/1972 |
| JP | S5377319 A | 7/1978 |
| JP | S5569704 A | 5/1980 |
| JP | S5759003 A | 4/1982 |
| JP | S5844201 A | 3/1983 |
| JP | S60206903 A | 10/1985 |
| JP | S61113902 A | 7/1986 |
| JP | S6229204 A | 2/1987 |
| JP | H10252407 A | 9/1998 |
| JP | H11247612 | 9/1999 |
| JP | 2000291404 A | 10/2000 |
| JP | 2001098904 A | 4/2001 |
| JP | 2002227606 A | 8/2002 |
| JP | 2004028093 A | 1/2004 |
| JP | 2004124813 A | 4/2004 |
| JP | 2004169694 A | 6/2004 |
| JP | 2005054804 A | 3/2005 |
| JP | 2008051094 A | 3/2008 |
| WO | 2005014978 A1 | 2/2005 |
| WO | 2005106207 A1 | 11/2005 |
| WO | 2010/138241 A1 | 12/2010 |

OTHER PUBLICATIONS

Extended European Search Report and Opinion issued in connection with corresponding EP Application No. 16167653.1 dated Aug. 30, 2016.

Jones et al., Apr. 29, 2015, U.S. Appl. No. 14/699,308.

Co pending patent application, Jeffrey Clarence Jones, U.S. Appl. No. 14/699,308, filed Apr. 29, 2015.

Jeffrey Clarence Jones, et al., Apr. 29, 2015, U.S. Appl. No. 14/699,308.

Mark Edward Stegemiller, et al., Sep. 9, 2005, U.S. Appl. No. 11/162,433.

Ching-Pang Lee, et al., Sep. 9, 2005, U.S. Appl. No. 11/162,434.

Kevin Samuel Klasing, et al., Aug. 21, 2006, U.S. Appl. No. 11/507,119.

Kevin Samuel Klasing, et al., Aug. 21, 2006, U.S. Appl. No. 11/507,116.

Kevin Samuel Klasing, et al., Aug. 21, 2006, U.S. Appl. No. 11/507,120.

Kevin Samuel Klasing, et al., Aug. 21, 2006, U.S. Appl. No. 11/507,121.

Ching-Pang Lee, et al., Aug. 21, 2006, U.S. Appl. No. 11/507,132.

Sergio Daniel Marques Amaral, et al., Apr. 17, 2009, U.S. Appl. No. 12/425,434.

Luke John Ammann, et al., Jan. 21, 2010, U.S. Appl. No. 12/691,691.

Alexander Stein, et al., Oct. 23, 2013, U.S. Appl. No. 14/061,169.

Rohit Chouhan, et al., Feb. 25, 2015, U.S. Appl. No. 14/631,409.

Unofficial English Translation of Japanese Notice of Allowance issued in connection with Related JP Application No. 2011007395 dated Nov. 4, 2015.

Unofficial English Translation of Chinese Office Action issued in connection with Related CN Application No. 201510429392.8 dated Apr. 20, 2016.

(56) References Cited

OTHER PUBLICATIONS

U.S. Non-Final Office Action issued in connection with Related U.S. Appl. No. 14/061,169 dated Jul. 13, 2016.
European Search Report and Opinion issued in connection with related EP Application No. 16157182.3 dated Jul. 25, 2016.
U.S. Final Office Action issued in connection with Related U.S. Appl. No. 14/061,169 dated Dec. 8, 2016.
Unofficial English Translation of Chinese Office Action issued in connection with Related CN Application No. 201410569188.1 dated Dec. 30, 2016.
U.S. Non-Final Office Action issued in connection with Related U.S. Appl. No. 14/631,409 dated Apr. 7, 2017.
U.S. Non-Final Office Action issued in connection with Related U.S. Appl. No. 14/061,169 dated Apr. 21, 2017.
Unofficial English Translation of Chinese Office Action issued in connection with Related CN Application No. 200710141733.7 dated May 30, 2011.
Booth et al., "Rotor-Tip Leakage: Part 1—Basic Methodology", Journal of Engineering for Power, Transactions of the ASME, vol. 104, pp. 154-161, Jan. 1982.
Mischo B., "Flow Physics and Profiling of Recessed Blade Tips: Impact on Performance and Heat Load," ASME GT2006-91074, pp. 1-11, May 8-11, 2006.
European Search Report and Opinion issued in connection with related EP Application No. 06254602.3 dated Oct. 1, 2008.
U.S. Non-Final Office Action issued in connection with Related U.S. Appl. No. 11/507,116 dated Mar. 31, 2009.
U.S. Non-Final Office Action issued in connection with Related U.S. Appl. No. 11/507,120 dated Mar. 31, 2009.
U.S. Non-Final Office Action issued in connection with Related U.S. Appl. No. 11/507,121 dated Apr. 22, 2009.
U.S. Non-Final Office Action issued in connection with Related U.S. Appl. No. 11/507,132 dated Apr. 22, 2009.
U.S. Non-Final Office Action issued in connection with Related U.S. Appl. No. 11/507,119 dated Apr. 23, 2009.
European Search Report and Opinion issued in connection with related EP Application No. 06254602.3 dated Jun. 10, 2009.
U.S. Final Office Action issued in connection with Related U.S. Appl. No. 11/507,116 dated Jul. 21, 2009.
U.S. Final Office Action issued in connection with Related U.S. Appl. No. 11/507,120 dated Jul. 28, 2009.
U.S. Final Office Action issued in connection with Related U.S. Appl. No. 11/507,121 dated Aug. 21, 2009.
U.S. Notice of Allowance issued in connection with Related U.S. Appl. No. 11/507,132 dated Aug. 21, 2009.
Unofficial English Translation of Chinese Office Action issued in connection with Related CN Application No. 200610151384.2 dated Jan. 22, 2010.
Unofficial English Translation of Chinese Office Action issued in connection with Related CN Application No. 200610151384.2 dated Sep. 1, 2010.
European Search Report and Opinion issued in connection with related EP Application No. 07114369.7 dated Sep. 3, 2010.
European Search Report and Opinion issued in connection with related EP Application No. 07114371.3 dated Sep. 14, 2010.
European Search Report and Opinion issued in connection with related EP Application No. 07114593.2 dated Sep. 29, 2010.
Unofficial English Translation of Japanese Office Action issued in connection with Related JP Application No. 2006245244 dated Jan. 25, 2011.
Unofficial English Translation of Chinese Office Action issued in connection with Related CN Application No. 200710141724.8 dated Jun. 9, 2011.
U.S. Non-Final Office Action issued in connection with Related U.S. Appl. No. 12/425,434 dated Sep. 28, 2011.
Unofficial English Translation of Japanese Office Action issued in connection with Related JP Application No. 2007211197 dated Oct. 25, 2011.

Unofficial English Translation of Japanese Office Action issued in connection with Related JP Application No. 2007213051 dated Oct. 25, 2011.
Unofficial English Translation of Japanese Notice of Allowance issued in connection with Related JP Application No. 2007211196 dated Nov. 1, 2011.
Unofficial English Translation of Japanese Office Action issued in connection with Related JP Application No. 2007204372 dated Nov. 1, 2011.
Unofficial English Translation of Japanese Office Action issued in connection with Related JP Application No. 2007211195 dated Nov. 22, 2011.
Unofficial English Translation of Japanese Notice of Allowance issued in connection with Related JP Application No. 2007211197 dated Feb. 14, 2012.
Unofficial English Translation of Japanese Notice of Allowance issued in connection with Related JP Application No. 2007211195 dated Apr. 10, 2012.
European Search Report and Opinion issued in connection with related EP Application No. 07114605.4 dated Apr. 27, 2012.
European Search Report and Opinion issued in connection with related EP Application No. 07114370.5 dated Jun. 22, 2012.
Unofficial English Translation of Japanese Office Action issued in connection with Related JP Application No. 2007204372 dated Aug. 28, 2012.
Unofficial English Translation of Chinese Office Action issued in connection with Related CN Application No. 201010167834.3 dated Sep. 14, 2012.
Unofficial English Translation of Japanese Office Action issued in connection with Related JP Application No. 2007213051 dated Nov. 13, 2012.
U.S. Non-Final Office Action issued in connection with Related U.S. Appl. No. 11/507,119 dated Feb. 22, 2013.
U.S. Non-Final Office Action issued in connection with Related U.S. Appl. No. 12/691,691 dated Apr. 16, 2013.
Unofficial English Translation of Japanese Office Action issued in connection with Related JP Application No. 2012059563 dated Apr. 16, 2013.
Unofficial English Translation of Japanese Office Action issued in connection with Related JP Application No. 2007213051 dated Jul. 30, 2013.
Unofficial English Translation of Japanese Notice of Allowance issued in connection with Related JP Application No. 2012059563 dated Aug. 6, 2013.
Canada Office Action issued in connection with Related CA Application No. 2596782 dated Sep. 16, 2013.
Canada Office Action issued in connection with Related CA Application No. 2596777 dated Sep. 19, 2013.
Canada Office Action issued in connection with Related CA Application No. 2596764 dated Sep. 24, 2013.
Canada Office Action issued in connection with Related CA Application No. 2596764 dated Oct. 2, 2013.
Unofficial English Translation of Japanese Notice of Allowance issued in connection with Related JP Application No. 2007213051 dated Nov. 19, 2013.
Unofficial English Translation of Japanese Office Action issued in connection with Related JP Application No. 2010092706 dated Jan. 21, 2014.
Unofficial English Translation of Chinese Office Action issued in connection with Related CN Application No. 201110031251.2 dated Mar. 4, 2014.
Unofficial English Translation of Japanese Notice of Allowance issued in connection with Related JP Application No. 2010092706 dated May 20, 2014.
Unofficial English Translation of Chinese Office Action issued in connection with Related CN Application No. 201110031251.2 dated Aug. 12, 2014.
Unofficial English Translation of Japanese Office Action issued in connection with Related JP Application No. 2011007395 dated Feb. 3, 2015.

(56) References Cited

OTHER PUBLICATIONS

Unofficial English Translation of Chinese Office Action issued in connection with Related CN Application No. 201410700641.8 dated Nov. 4, 2015.

* cited by examiner

ROTOR BLADE HAVING A FLARED TIP

FIELD OF THE INVENTION

The present invention generally relates to a rotor blade for a turbine. More particularly, this invention involves a rotor blade having a flared tip configured for cooling a trailing edge portion of the rotor blade.

BACKGROUND OF THE INVENTION

In an air-ingesting turbo machine (e.g., a gas turbine), air is pressurized by a compressor and then mixed with fuel and ignited within an annular array of combustors to generate combustion gases. The hot gases are routed through a liner and into a hot gas path defined within a turbine section of the turbo machine. Kinetic energy is extracted from the combustion gases via one or more rows of turbine rotor blades that are connected to a rotor shaft. The extracted kinetic energy causes the rotor shaft to rotate, thus producing work.

The turbine rotor blades or blades generally operate in extremely high temperature environments. In order to achieve adequate service life, the blades typically include various internal cooling passages or cavities. During operation of the gas turbine, a cooling medium such as compressed air is routed through the internal cooling passages. A portion of the cooling medium may be routed out of the internal cooling passages through various cooling holes defined along the blade surface, thereby reducing high surface temperatures. An area that is generally challenging to cool effectively via the cooling medium is a blade tip portion of the turbine rotor blade, more particularly a trailing edge region of the blade tip.

The blade tip is generally defined at a radial extremity of the turbine rotor blade and is positioned radially inward from a turbine shroud that circumscribes the row of blades. The turbine shroud defines a radially outward boundary of the hot gas path. The proximity of the blade tip to the turbine shroud makes the blade tip difficult to cool. The contiguity of the shroud and the blade tip minimizes the leakage of hot operating fluid past the tip which correspondingly improves turbine efficiency.

In particular blade designs, a tip cavity formed by a recessed tip cap and a pressure side wall and a suction side wall provides a means for achieving minimal tip clearance while at the same time assuring adequate blade tip cooling. The pressure side wall and the suction side wall extend radially outwardly from the tip cap. At least a portion of at least one of the suction side wall and the pressure side wall is flared or inclined outward with respect to a radial centerline of the blade. The pressure side wall intersects with the suction side wall at a leading edge portion of the blade. However, the pressure side wall does not intersect with the suction side wall at the trailing edge, thus forming an opening therebetween. This configuration is generally due to the lack of an appropriate wall thickness of the blade along the trialing edge.

In operation, the cooling medium is exhausted from the internal passages through holes in the tip cap into the tip cavity, thus effectively cooling the pressure and suction side walls as well as the tip cap surface. However, it may also be desirable to effectively cool the leading and trailing edges of the airfoil. Therefore there is a need for a blade tip design having improved blade tip trailing edge cooling.

BRIEF DESCRIPTION OF THE INVENTION

Aspects and advantages of the invention are set forth below in the following description, or may be obvious from the description, or may be learned through practice of the invention.

One embodiment of the present invention is a rotor blade. The rotor blade includes an airfoil having a an airfoil having a leading edge and a trailing edge, a pressure side wall and a suction side wall connected at the leading and trailing edges, a blade tip having a radially outer surface that extends along the pressure and suction side walls between the leading and trailing edges, and an internal cavity for receiving a cooling medium. The airfoil further comprises a tip cavity that is formed at the blade tip. The tip cavity includes a tip cap that is recessed radially inwardly from the radially outer surface of the blade tip and that is surrounded continuously by the pressure and suction side walls. The tip cap further includes an aperture that extends through an inner surface and a radially opposed top surface of the tip cap. The aperture provides for fluid communication between the internal cavity and the tip cavity. An exhaust port provides for fluid communication from the tip cavity through the trailing edge, the pressure side wall or the suction side wall. A portion of at least one of the suction side wall or the pressure side wall that defines the tip cavity extends obliquely outwardly from the tip cavity with respect to a radial direction.

Another embodiment of the present invention is a gas turbine. The gas turbine includes, in serial flow order, a compressor section, a combustion section and a turbine section. The turbine section includes a rotor shaft and a plurality of rotor blades that are coupled to the rotor blade. Each rotor blade includes an airfoil having a leading edge and a trailing edge, a pressure side wall and a suction side wall connected at the leading and trailing edges, a blade tip having a radially outer surface that extends along the pressure and suction side walls between the leading and trailing edges, and an internal cavity for receiving a cooling medium. The airfoil further includes a tip cavity that is formed at the blade tip. The tip cavity includes a tip cap that is recessed radially inwardly from the radially outer surface and that is surrounded continuously by the pressure and suction side walls. The tip cap further includes an aperture that extends through an inner surface and a radially opposed top surface of the tip cap and that provides for fluid communication between the internal cavity and the tip cavity. An exhaust port provides for fluid communication from the tip cavity through the trailing edge, the pressure side wall or the suction side wall. A portion of at least one of the suction side wall or the pressure side wall that defines the tip cavity extends obliquely outwardly from the tip cavity with respect to a radial direction.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
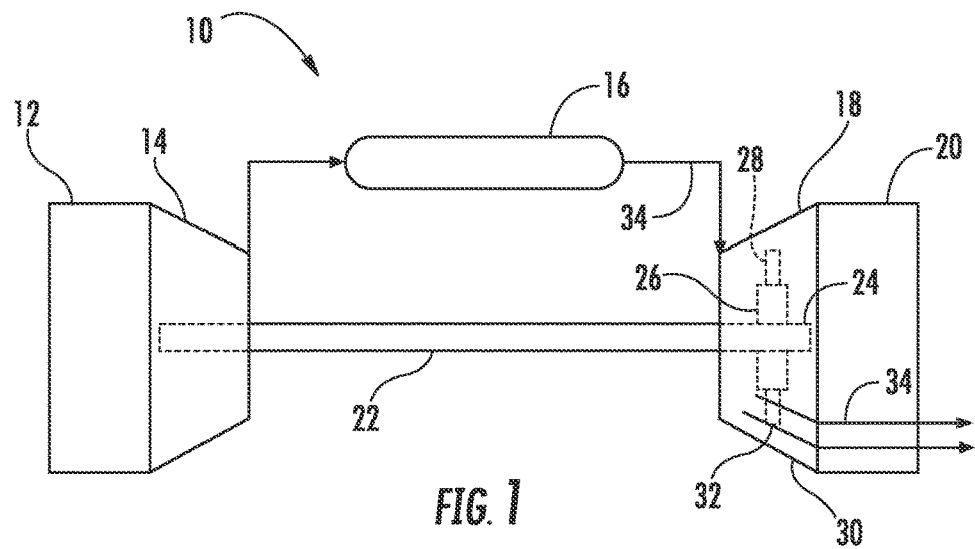
FIG. 1 illustrates a functional diagram of an exemplary gas turbine as may incorporate at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component and/or substantially perpendicular to an axial centerline of the turbomachine, and the term "axially" refers to the relative direction that is substantially parallel and/or coaxially aligned to an axial centerline of a particular component and/or to an axial centerline of the turbomachine.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in any type of turbine including but not limited to a steam turbine or marine gas turbine.

Referring now to the drawings, FIG. 1 illustrates a schematic diagram of one embodiment of a gas turbine 10. The gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotor blades 28 extending radially outwardly from and being interconnected to the rotor disk 26. Each rotor disk 26 may, in turn, be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 28, thus causing the rotor shaft 24 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
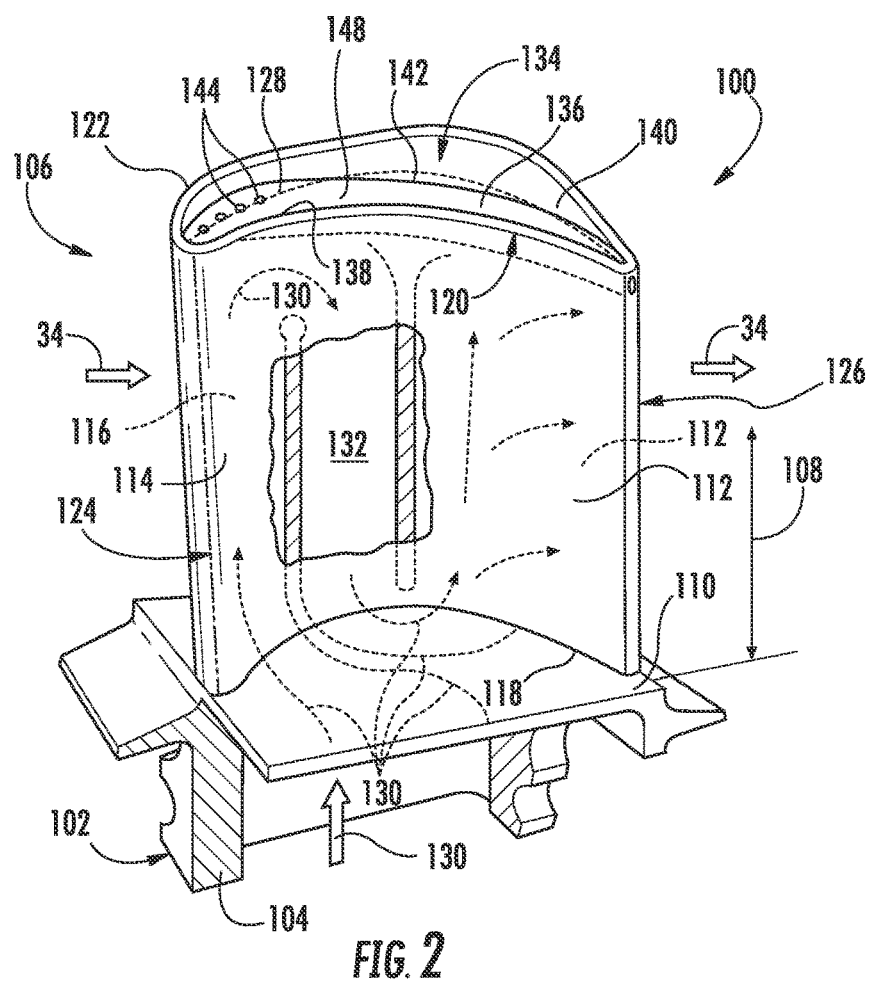
FIG. 2 is a perspective view of an exemplary rotor blade as may be incorporated in the gas turbine shown in FIG. 1 and as may incorporate various embodiments of the present disclosure.

FIG. 2 is a perspective view of an exemplary rotor blade 100 as may incorporate one or more embodiments of the present invention and as may be incorporated into the turbine section 18 of the gas turbine 10 in place of rotor blade 28 as shown in FIG. 1. As shown in FIG. 2, the rotor blade 100 generally includes a mounting or shank portion 102 having a mounting body 104 and an airfoil 106 that extends outwardly in a radial direction 108 from a platform portion 110 of the rotor blade 100. The platform 110 generally serves as a radially inward boundary for the combustion gases 34 flowing through the hot gas path 32 of the turbine section 18 (FIG. 1). As shown in FIG. 2, the mounting body 104 of the mounting or shank portion 102 may extend radially inwardly from the platform 110 and may include a root structure, such as a dovetail, configured to interconnect or secure the rotor blade 100 to the rotor disk 26 (FIG. 1).

The airfoil 106 includes an outer surface 112 that surrounds the airfoil 106. The outer surface 112 is at least partially defined by a pressure side wall 114 and an opposing suction side wall 116. The pressure side wall 114 and the suction side wall 116 extend substantially radially outwardly from the platform 110 in span from a root 118 of the airfoil 106 to a blade tip or tip 120 of the airfoil 106. The root 118 of the airfoil 106 may be defined at an intersection between the airfoil 106 and the platform 110. The blade tip 120 is disposed radially opposite the root 118. As such, a radially outer surface 122 of the blade the tip 120 may generally define the radially outermost portion of the rotor blade 100.

The pressure side wall 114 and the suction side wall 116 are joined together or interconnected at a leading edge 124 of the airfoil 106 which is oriented into the flow of combustion gases 34. The pressure side wall 114 and the suction side wall 116 are also joined together or interconnected at a trailing edge 126 of the airfoil 106 which is spaced downstream from the leading edge 124. The pressure side wall 114 and the suction side wall 116 are continuous about the trailing edge 126. The pressure side wall 114 is generally concave and the suction side wall 116 is generally convex. The chord of the airfoil 106 is the length of a straight line connecting the leading edge 114 and the trailing edge 116 and the direction from the leading edge 114 to the trailing edge 116 is typically described as the chordwise direction. A chordwise line bisecting the pressure side wall 114 and the suction side wall 116 is typically referred to as the mean-line or camber-line 128 of the airfoil 106.

Internal cooling of turbine rotor blades is well known and typically utilizes a cooling medium, as indicated by solid and dashed arrows 130, such as a relatively cool compressed air bled from the compressor section 14 (FIG. 1) of the gas turbine engine 10 which is suitably channeled through the mounting or shank portion 102 of the rotor blade 100 and into an internal cavity or passage 132 that is at least partially defined within the airfoil 106 between the pressure side wall 114 and the suction side wall 116.

The internal cavity 132 may take any conventional form and is typically in the form of a serpentine passage. The cooling medium 130 enters the internal cavity 132 from the mounting or shank portion 102 and passes through the internal cavity 132 for suitably cooling the airfoil 106 from the heating effect of the combustion gases 34 flowing over the outer surface 112 thereof. Film cooling holes (not shown) may be disposed on the pressure side wall 114 and/or the suction side wall 116 for conventionally film cooling the outer surface 112 of the airfoil 106.

In various embodiments, a tip cavity or plenum 134 is formed at or within the blade tip 120. The tip cavity 134 is at least partially formed by a tip cap 136. As shown in FIG. 2, the tip cap 136 is recessed radially inwardly from the blade tip 120 and/or the top surface 122 of the blade tip 120 and forms a floor portion of the tip cavity 134. The tip cap 136 is surrounded continuously by the pressure side wall 114 and the suction side wall 116.

The tip cap 136 is connected to and/or forms a seal against an inner surface or side 138 of the pressure side wall 114 and an inner surface or side 140 of the suction side wall 116 along a periphery 142 of the tip cap 136 between the leading and trailing edges 124, 126 of the airfoil 106. The tip cap 136 further includes a plurality of holes or apertures 144 that extend through an inner surface or side 146 and a top surface or side 148 of the tip cap 136 and that provide for fluid communication between the internal cavity 132 and the tip cavity 134.

Figure 3:
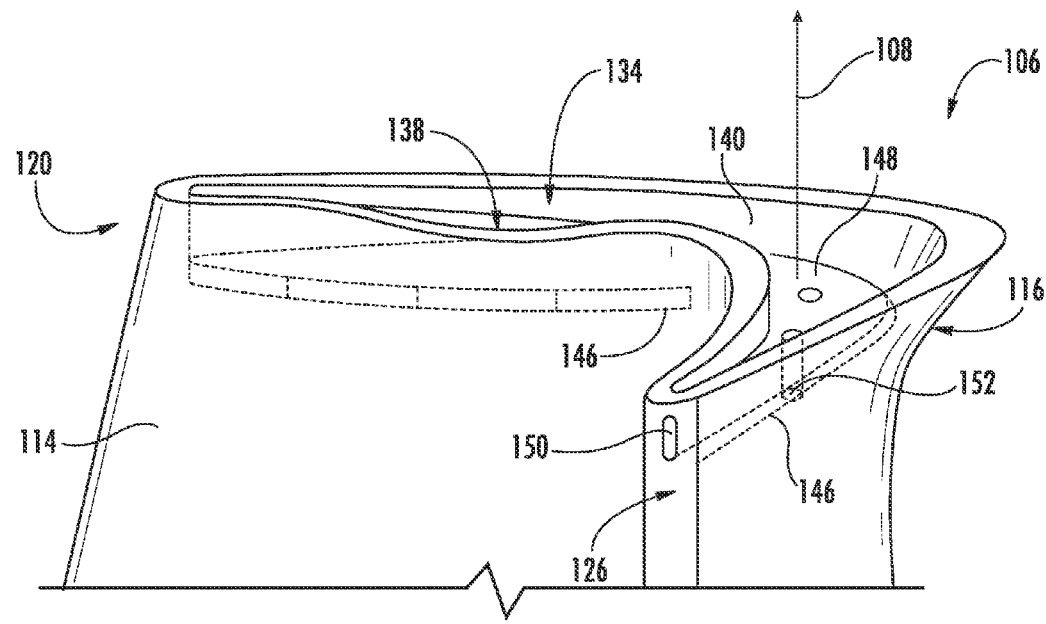
FIG. 3 is a perspective view of a portion of an exemplary airfoil according to at least one embodiment of the present invention.
Figure 4:
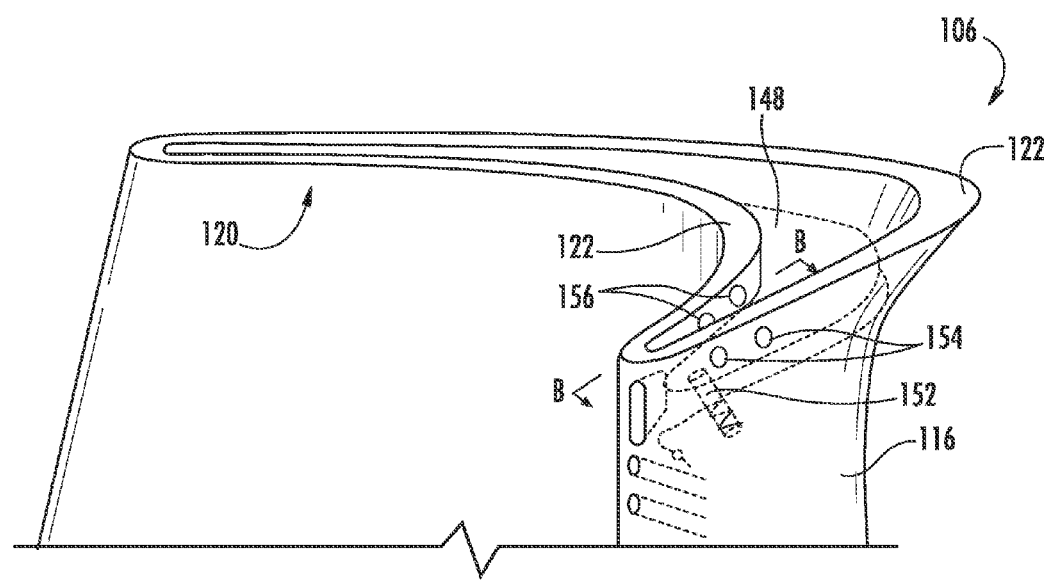
FIG. 4 is a perspective view of a portion of an exemplary airfoil according to at least one embodiment of the present invention.
Figure 5:
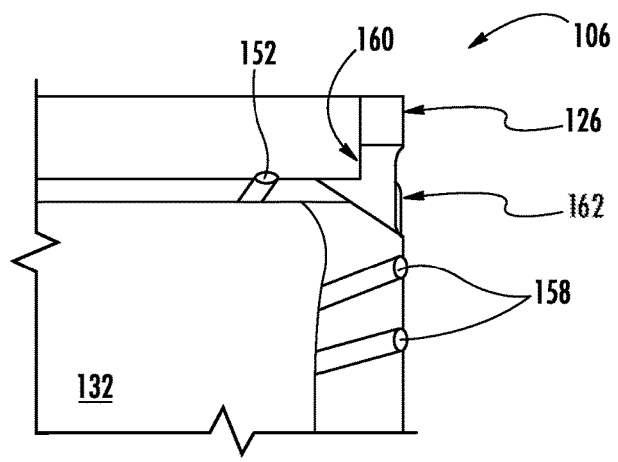
FIG. 5 is a cross sectioned side view of a portion of the airfoil taken along section lines A-A as shown in FIG. 4, according to at least one embodiment of the present invention.

FIG. 3 provides a perspective view of a portion the airfoil 106 which includes the blade tip 120 according to at least one embodiment of the present invention. FIG. 4 provides a perspective view of a portion the airfoil 106 which includes the blade tip 120 according to at least one embodiment of the present invention. FIG. 5 provides a cross sectioned side view of a portion of the airfoil 106 taken along section lines A-A as shown in FIG. 4, according to at least one embodiment.

In particular embodiments, as shown in FIG. 3, a portion of at least one of the suction side wall 116 or the pressure side wall 114 that defines the tip cavity 134 extends obliquely outwardly from the tip cavity 134 with respect to radial direction 108 and/or with respect to the outer surface 112 of the airfoil 106. Radial direction 108 may be substantially perpendicular to the top surface 148 of the tip cap 136.

In various embodiments, as shown in FIG. 3, a portion of the suction side wall 116 that defines the tip cavity 134 and a portion of the pressure side wall 114 that defines the tip cavity 134 extends obliquely outwardly from the tip cavity 134 with respect to radial direction 108 and/or with respect to the outer surface 112 of the airfoil 106. In various embodiments, a portion of the suction side wall 116 that defines the tip cavity 134 extends obliquely outwardly from the tip cavity 134 with respect to radial direction 108 and/or with respect to the outer surface 112 of the airfoil 106. In various embodiments, a portion of the pressure side wall 114 that defines the tip cavity 134 extends obliquely outwardly from the tip cavity 134 with respect to radial direction 108 and/or with respect to the outer surface 112 of the airfoil 106.

A portion of the inner surface or side 140 of the suction side wall 116 that defines the tip cavity 134 may extend obliquely outwardly from the tip cavity 134 with respect to radial direction 108, thus increasing an overall volume of the tip cavity 134. In addition or in the alternative, as shown in FIG. 3, a portion of the inner surface or side 138 of the pressure side wall 114 that defines the tip cavity 134 may extend obliquely outwardly from the tip cavity 134 with respect to radial direction 108, thus increasing an overall volume of the tip cavity 134.

In various embodiments, as shown in FIG. 3, at least one exhaust port provides for fluid communication of a cooling medium from the tip cavity through the trailing edge 126, the pressure side wall 114 or the suction side wall 116. The airfoil 106 may include any number of exhaust ports and is not limited to a particular number of exhaust ports or to particular locations of exhaust ports shown in the figures provided and described herein unless specifically provided in the claims.

In various embodiments, as shown in FIG. 3, the airfoil 106 includes an exhaust port 150 that extends through the trailing edge 126. The exhaust port 150 may be generally defined and/or positioned between the top surface 146 of the tip cap 136 and the radially outer surface 122 of the blade tip 120. In one embodiment, the exhaust port 150 extends through the trailing edge 126 along or aligned with the camber line 128 (FIG. 2) of the airfoil 106. The exhaust port 150 may be circular or oblong or have any suitable cross sectional shape.

As shown in FIG. 3, at least one aperture 152 of the plurality of apertures 144 may extend through the inner surface 146 and the top surface 148 of the tip cap 136 proximate and/or adjacent to the exhaust port 150. The aperture 152 provides for fluid communication between the internal cavity 132 and the tip cavity 134 in an area that is upstream from the exhaust port 150.

In various embodiments, as shown in FIG. 4, the airfoil 106 may include one or more exhaust ports 154 that extend through the suction side wall 116 between the top surface 148 of the tip cap 136 and the radially outer surface 122 of the blade tip 120 proximate and/or adjacent to the trailing edge 126. In addition or in the alternative, the airfoil 106 may include one or more exhaust ports 156 that extend through the pressure side wall 114 between the top surface 122 of the tip cap 136 and the radially outer surface 122 of the blade tip 120 proximate and/or adjacent to the trailing edge 126.

In particular embodiments, as shown in FIGS. 4 and 5, aperture 152 is angled towards the trailing edge 126 of the airfoil 106. In particular embodiments, one or more holes 158 are defined along the trailing edge 126 of the airfoil 106 radially below the tip cap 136 and/or radially below exhaust port 150. The one or more holes 158 may be in fluid communication with the internal cavity 132. In various embodiments, as shown in FIG. 5, exhaust port 150 may be tapered or shaped such that an inlet 160 of exhaust port 150 is smaller or has a smaller cross sectional area than an outlet 162 of exhaust port 150.

Figure 6:
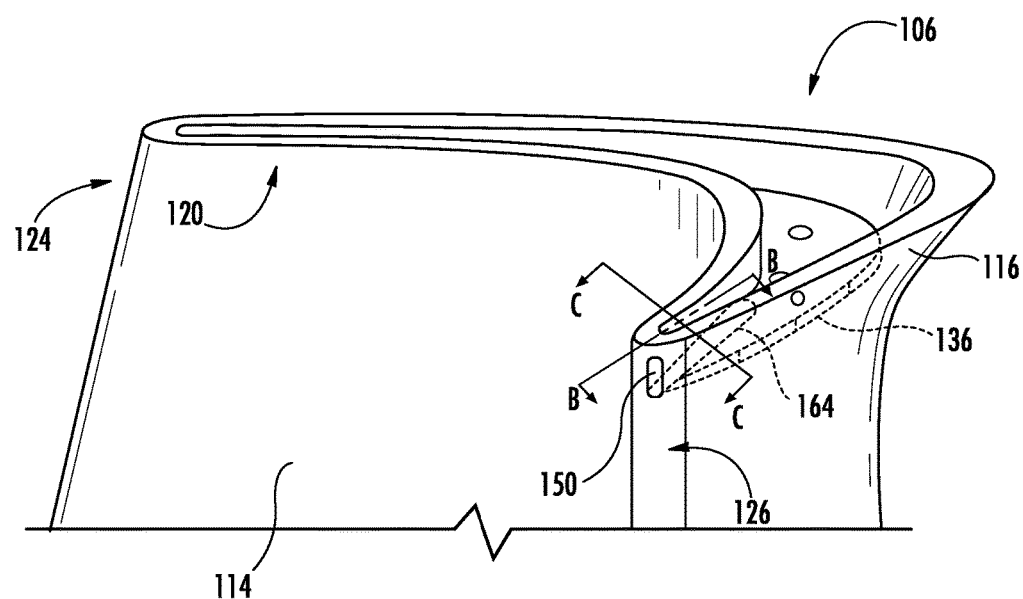
FIG. 6 is a perspective view of a portion of an exemplary airfoil according to at least one embodiment of the present invention.
Figure 7:
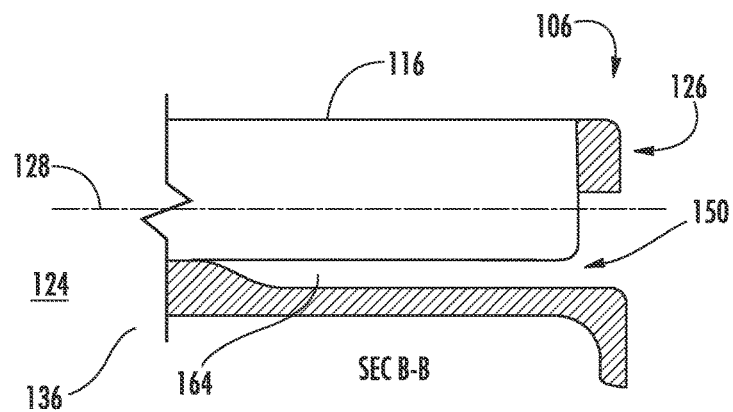
FIG. 7 is a cross sectioned side view of a portion of the airfoil taken along section lines B-B as shown in FIG. 6, according to at least one embodiment of the present invention.
Figure 8:
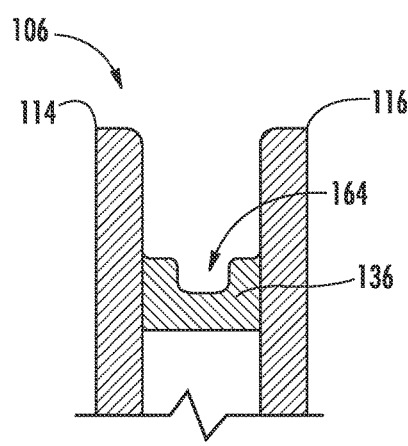
FIG. 8 is a cross sectioned view of a portion of the airfoil taken along lines C-C as shown in FIG. 6, according to at least one embodiment of the present invention.

FIG. 6 provides a perspective view of a portion the airfoil 106 which includes the blade tip 120 according to at least one embodiment of the present invention. FIG. 7 provides a cross sectioned side view of a portion of the airfoil 106 taken along section lines B-B as shown in FIG. 6, according to at least one embodiment. FIG. 8 provides a cross sectioned view of a portion of the airfoil taken along lines C-C shown in FIG. 6 according to at least one embodiment of the present invention.

In particular embodiments, as shown in FIGS. 6-8 collectively, a surface indentation such as a trench, slot or groove 164 is defined within the top surface 148 of the tip cap 136. The trench 164 may be defined proximate to exhaust port 150. In particular embodiments, the trench 164 extends from the trailing edge 126 towards the leading edge 124 of the airfoil 106. In particular embodiments, the trench 164 extends along the camber line 128 (FIG. 2) of the airfoil 106. In particular embodiments, the trench 164 may at least partially define exhaust port 150.

Figure 9:
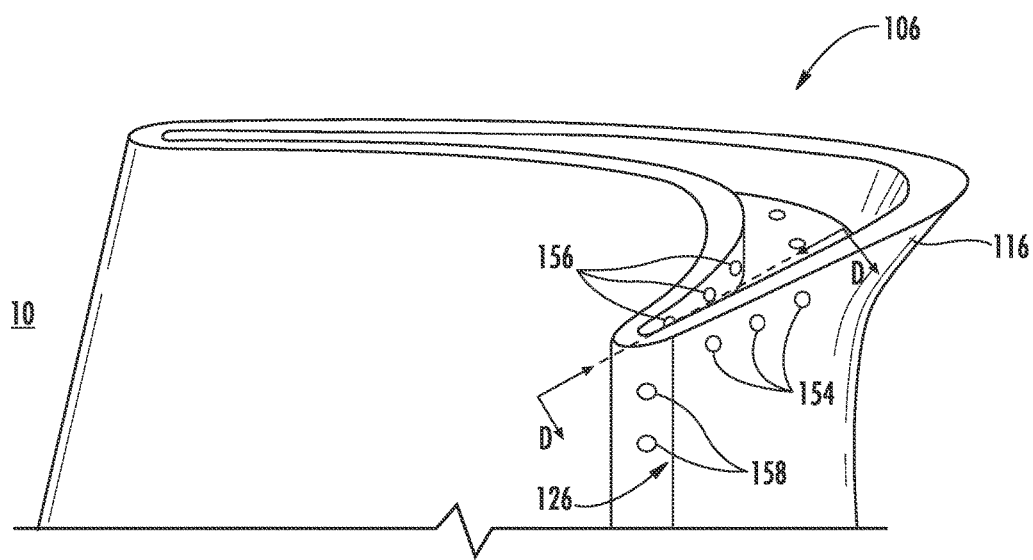
FIG. 9 is a perspective view of a portion an exemplary airfoil according to at least one embodiment of the present invention.
Figure 10:
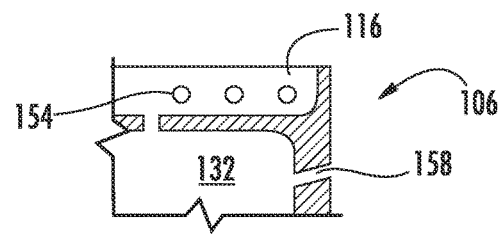
FIG. 10 provides a cross sectioned side view of a portion of the airfoil taken along section lines D-D as shown in FIG. 9, according to at least one embodiment of the present invention.

FIG. 9 provides a perspective view of a portion the airfoil 106 which includes the blade tip 120 according to at least one embodiment of the present invention. FIG. 10 provides a cross sectioned side view of a portion of the airfoil 106 taken along section lines D-D as shown in FIG. 9, according to at least one embodiment. In particular embodiments, as shown in FIGS. 9 and 10 collectively, the airfoil 106 may include exhaust ports 154 positioned along the suction side wall 116 proximate to the trailing edge 126 that provide for fluid communication out of the tip cavity 134. In addition or in the alternative, the airfoil 106 may include exhaust ports 156 positioned along the pressure side wall 114 proximate to the trailing edge 126 that provide for fluid communication out of the tip cavity 134. In particular embodiments, as shown in FIGS. 9 and 10, the airfoil 106 may include hole(s) 158 defined along the trialing edge 126.

Figure 11:
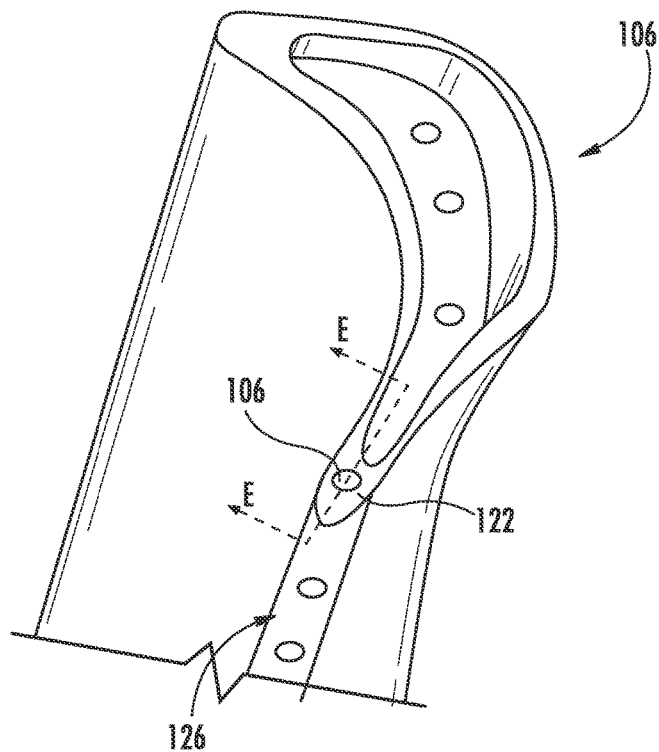
FIG. 11 is a perspective view of a portion an exemplary airfoil according to at least one embodiment of the present invention.
Figure 12:
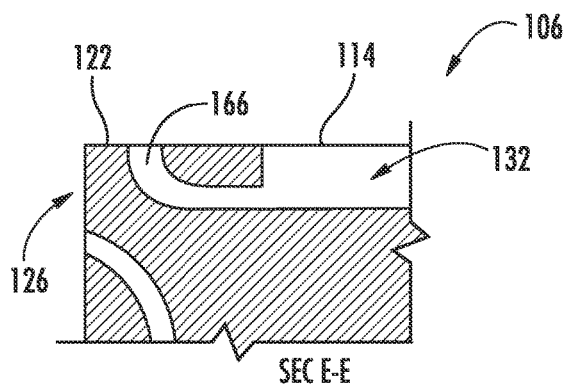
FIG. 12 provides a cross sectioned side view of a portion of the airfoil taken along section lines E-E as shown in FIG. 11, according to at least one embodiment of the present invention.

FIG. 11 provides a perspective view of a portion the airfoil 106 which includes the blade tip 120 according to at least one embodiment of the present invention. FIG. 12 provides a cross sectioned side view of a portion of the airfoil 106 taken along section lines E-E as shown in FIG. 11, according to at least one embodiment. In particular embodiments, as shown in FIGS. 11 and 12 collectively, the airfoil 106 may include an exhaust port 166 that extends through the radially outer surface 122 of the blade tip 120 at the trailing edge 126 of the airfoil 106. As shown in FIG. 12, a portion of exhaust port 166 may extend chordwise before turning radially upwardly and penetrating the radially outer surface 122. In this manner, exhaust port 166 may direct a portion of the cooling medium radially outwards from the blade tip 120 towards a shroud (not shown) of the gas turbine 10. As shown in FIG. 12, exhaust port 166 is in fluid communication with the tip cavity 134.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A rotor blade, comprising:
an airfoil having a leading edge and a trailing edge, a pressure side wall and a suction side wall connected at the leading and trailing edges, a blade tip having a continuous radially outer surface, and an internal cavity for receiving a cooling medium, wherein the continuous radially outer surface of the blade tip extends along the pressure side wall from the leading edge to the trailing edge, across the trailing edge from the pressure side wall to the suction side wall, along the suction side wall from the trailing edge to the leading edge, and across the leading edge from the suction side wall to the pressure side wall, the airfoil further comprising:
a tip cavity formed at the blade tip, the tip cavity including a tip cap recessed radially inwardly from the continuous radially outer surface of the blade tip, the tip cap continuously surrounded by and connected to the pressure and suction side walls along a periphery of the tip cap between the leading edge and the trailing edge, wherein the tip cap further includes an aperture that extends through an inner surface and a radially opposed top surface of the tip cap and provides for fluid communication between the internal cavity and the tip cavity, and an exhaust port that extends through the trailing edge between the top surface of the tip cap and the continuous radially outer surface of the blade tip and provides for fluid communication from the tip cavity through the trailing edge, the exhaust port tapered such that an inlet of the exhaust port has a smaller cross sectional area than an outlet of the exhaust port;
wherein an inner surface of the suction side wall that defines the tip cavity extends obliquely outwardly with respect to a radial direction from the tip cavity to the continuous radially outer surface of the blade tip, wherein the exhaust port extends through the continuous radially outer surface of the blade tip at the trailing edge of the airfoil, and wherein the exhaust port is in fluid communication with the tip cavity.

2. The rotor blade as in claim 1, further comprising a trench defined within the top surface of the tip cap.

3. The rotor blade as in claim 2, wherein the trench extends along a camber line of the airfoil.

4. The rotor blade as in claim 2, wherein the trench extends along a camber line of the airfoil from the trailing edge towards the leading edge of the airfoil.

5. The rotor blade as in claim 1, wherein the aperture that extends through the inner and top surfaces of the tip cap is angled towards the trailing edge of the airfoil.

6. The rotor blade as in claim 1, further comprising a hole defined along the trailing edge of the airfoil and positioned radially below the tip cap, wherein the hole is in fluid communication with the internal cavity.

7. A gas turbine, comprising:
a compressor section;
a combustion section; and
a turbine section, the turbine section having a rotor shaft and a plurality of rotor blades coupled to the rotor shaft, each rotor blade comprising:
an airfoil having a leading edge and a trailing edge, a pressure side wall and a suction side wall connected at the leading and trailing edges, a blade tip having a continuous radially outer surface, and an internal cavity for receiving a cooling medium, wherein the continuous radially outer surface of the blade tip extends along the pressure side wall from the leading edge to the trailing edge, across the trailing edge from the pressure side wall to the suction side wall, along the suction side wall from the trailing edge to the leading edge, and across the leading edge from the suction side wall to the pressure side wall, the airfoil further comprising:
a tip cavity formed at the blade tip, the tip cavity including a tip cap recessed radially inwardly from the continuous radially outer surface of the blade tip, the tip cap continuously surrounded by and connected to the pressure and suction side walls along a periphery of the tip cap between the leading edge and the trailing edge, wherein the tip cap further includes an aperture that extends through an inner surface and a radially opposed top surface of the tip cap and provides for fluid communication between the internal cavity and the tip cavity, and an exhaust port in fluid communication with the tip cavity, the exhaust port extends through the trailing edge from an inlet between the top surface of the tip cap and the continuous radially outer surface of the blade tip to an outlet in the continuous radially outer surface of the blade tip at the trailing edge of the airfoil and provides for fluid communication from the tip cavity through the trailing edge;
wherein an inner surface of the suction side wall that defines the tip cavity extends obliquely outwardly with respect to a radial direction from the tip cavity to the continuous radially outer surface of the blade tip.

8. The gas turbine as in claim 7, further comprising a trench defined within the top surface of the tip cap, wherein the trench extends along a camber line of the airfoil from the trailing edge towards the leading edge of the airfoil.

9. The gas turbine as in claim 7, further comprising a hole defined along the trailing edge of the airfoil and positioned radially below the tip cap, wherein the hole is in fluid communication with the internal cavity.

* * * * *